US008788477B1

(12) United States Patent
Jung et al.

(10) Patent No.: US 8,788,477 B1
(45) Date of Patent: Jul. 22, 2014

(54) IDENTIFYING ADDRESSES AND TITLES OF AUTHORITATIVE WEB PAGES BY ANALYZING SEARCH QUERIES IN QUERY LOGS

(75) Inventors: Hyunuk Jung, Gyeonggi-do (KR); Seokgyo Jung, Seoul (KR); Yong Soo Hwang, Seoul (KR)

(73) Assignee: Google Inc., Mountain View, CA (US)

( * ) Notice: Subject to any disclaimer, the term of this patent is extended or adjusted under 35 U.S.C. 154(b) by 57 days.

(21) Appl. No.: 13/289,406

(22) Filed: Nov. 4, 2011

Related U.S. Application Data

(60) Provisional application No. 61/536,287, filed on Sep. 19, 2011.

(51) Int. Cl.
*G06F 17/20* (2006.01)
*G06F 7/00* (2006.01)
(52) U.S. Cl.
USPC .............................. 707/707; 707/706; 707/713
(58) Field of Classification Search
CPC ............ G06F 17/3064; G06F 17/3071; G06F 17/30864; G06F 17/30867; G06F 17/30637
USPC .......................................... 707/713, 723, 728
See application file for complete search history.

(56) References Cited

U.S. PATENT DOCUMENTS 8,145,623 B1 * 3/2012 Mehta et al. .................. 707/713
2011/0016116 A1 * 1/2011 Chellapilla et al. ........... 707/728
2011/0320443 A1 * 12/2011 Ray et al. ...................... 707/723

* cited by examiner

*Primary Examiner* — Ann Chempakaseril
(74) *Attorney, Agent, or Firm* — Harrity & Harrity, LLP

(57) ABSTRACT

One or more server devices may extract, from a query log, query log information, associated with a first search query, that may include information regarding the first search query, and information regarding search results that were provided based on the first search query. The one or more server devices may calculate, based on the query log information, one or more metrics derived from one or more selections of a particular search result provided based on the first search query. The one or more server devices may determine, based on the one or more metrics, that the particular search result corresponds to an authoritative web page associated with the first search query. Further, the one or more server devices may identify, upon determining that the particular search result corresponds to an authoritative web page, a title associated with the particular search result.

21 Claims, 8 Drawing Sheets

US 8,788,477 B1

IDENTIFYING ADDRESSES AND TITLES OF AUTHORITATIVE WEB PAGES BY ANALYZING SEARCH QUERIES IN QUERY LOGS

RELATED APPLICATIONS

The present application claims the benefit of U.S. Provisional Patent Application No. 61/536,287, titled "IDENTIFYING ADDRESSES AND TITLES OF AUTHORITATIVE WEB PAGES BY ANALYZING SEARCH QUERIES IN QUERY LOGS," which was filed on Sep. 19, 2011, and which is hereby incorporated by reference as though fully set forth herein.

BACKGROUND

Many techniques are available to users today to find information on the World Wide Web ("web"). For example, users often use web browsers and/or search engines to find information of interest.

Search engines provide search results in response to a search query from a user. The search results are often presented in a ranked list, based on the search query from the user. Sometimes, an "authoritative" web page (e.g., a web page that is trusted by users who submit a search query, a web page that includes a large amount of information about the search query, etc.), associated with the search query, may not be listed as the highest ranked search result. For example, a user may submit a search query that identifies an actor who has been in the news recently. A search based on the actor's name may return a search result from a news web site as the top search result(s). However, an authoritative web page about the actor (e.g., a web page which may list a biography of the actor, a filmography of the actor, a list of links to other web sites about the actor, etc.), which may be of interest to the user, may be further down in the search results, and may, thus, not be as easily accessible to the user. Additionally, a user may not be able to quickly identify which search result is an authoritative web page.

SUMMARY

According to an implementation, a method may include extracting, from a query log, query log information associated with a first search query. The extracted query log information may include information regarding the first search query, and information regarding search results that were provided in response to the first search query. The method may include calculating, based on the query log information, one or more metrics derived from one or more selections of the particular search result when the particular search result was provided in response to the first search query. The method may further include determining, based on the one or more metrics derived from one or more selections of the particular search result when the particular search result was provided in response to the first search query, that the particular search result corresponds to an authoritative web page associated with the first search query. Further, the method may include identifying, upon determining that the particular search result corresponds to an authoritative web page associated with the first search query, a title associated with the particular search result.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

Users of search engines often desire to view "authoritative" web pages that are associated with search queries (e.g., trusted web pages that include a relatively large amount of information regarding a given topic associated with a search query). For example, when a user provides the search query, "White House," the user may desire to access the authoritative web page for the White House (located at the Uniform Resource Locator, or "URL," www.whitehouse.gov), regardless of where that web page falls within the search results for the search query.

A system and/or method, described herein, may enable a search engine to determine whether a search query is associated with an authoritative web page. If the search query is associated with an authoritative web page, an address (e.g., a URL) and/or title for the authoritative web page may be presented on a search result page, in conjunction with a list of search results that are responsive to the search query. The address and/or title for the authoritative web page may be specifically identified on the search result page. For example, the address and/or title for the authoritative web page may be placed in a prominent location on the search results page (e.g., placed in a position above the list of search results on the search result page).

Additionally, or alternatively, other indicators may be used to visually distinguish the authoritative web page from the rest of the search results (e.g., words, such as "Authoritative web page" may identify the authoritative web page; formatting, such as bold, larger font, and/or different color(s), may be used; a divider, such as a horizontal line, may be inserted between the address and/or title for the authoritative web page and the list of search results, etc.).

Figure 1:
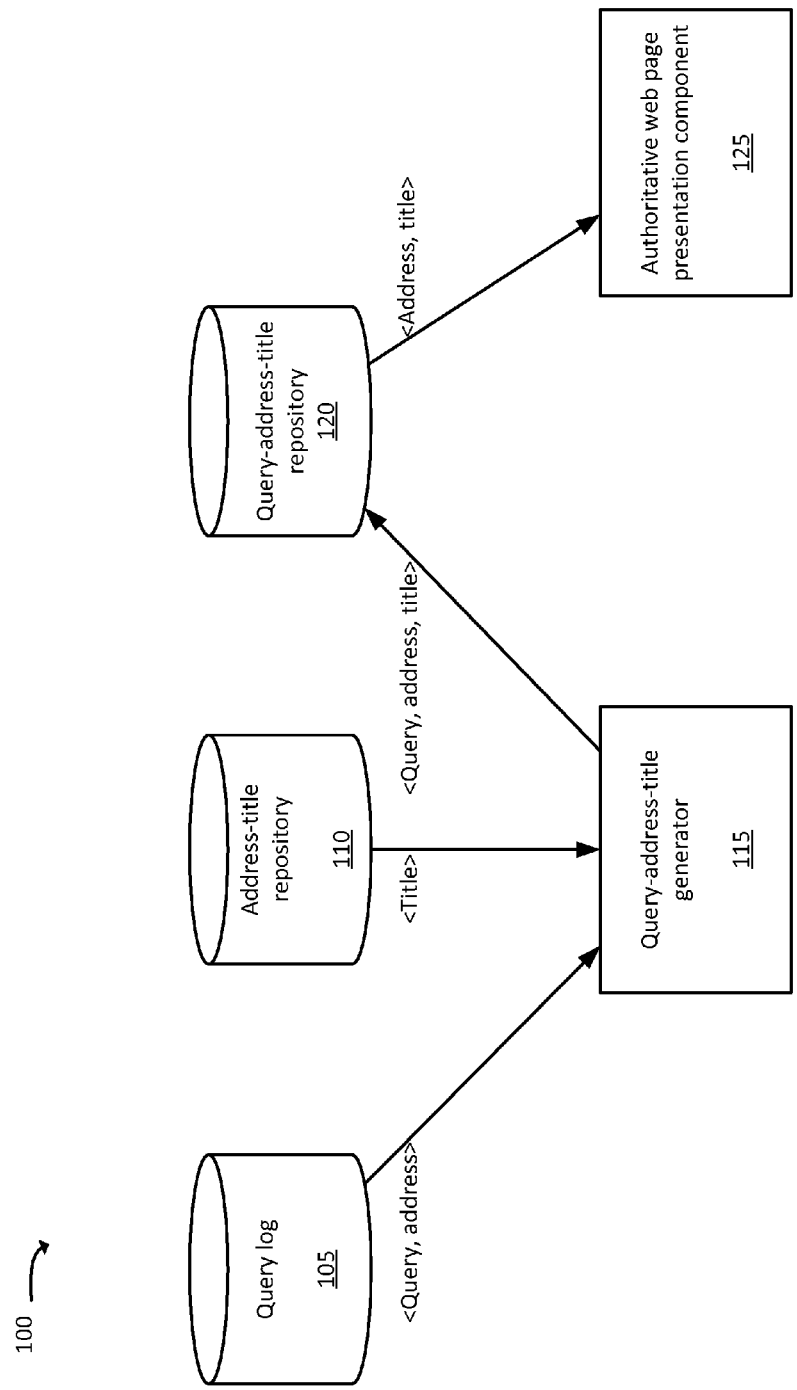
FIG. 1 is a diagram illustrating an overview of an example implementation described herein.

FIG. 1 is a diagram illustrating an overview of an example system 100 described herein. System 100 may include a query log 105, address-title repository 110, query-address-title generator 115, query-address-title repository 120, and authoritative web page presentation component 125.

Query log 105 may store data relating to past queries and search results associated with the past queries. The data may include information for many search queries (e.g., millions of search queries). For example, the data for a particular query may identify a quantity of times the search query was received over a particular duration of time (e.g., within the past 180 days, within the past 30 days, within the past week, etc.), a quantity of times that particular search results associated with the particular search query were selected (e.g., clicked), a total quantity of times that any search result associated with the particular search query was selected, a position of each search result in a ranked/ordered list of search results that were returned for the particular search query, or any other data associated with the particular search query. Any information collected regarding actions of users may be anonymized and collected only after the users opt in (i.e., the users expressly request to have information regarding their actions collected).

Query log 105 may also store information associated with search results that are responsive to (e.g., have been identified as relevant to) search queries stored by query log 105. Such information may include addresses (e.g., URLs) for the search results.

Address-title repository 110 may store information that associates addresses with titles. A title may refer to a name associated with a web page. A title of a web page is commonly provided, by a search engine, when the web page is presented in a list of search results. Titles, for web pages, can be identified in many different ways. For example, a title may be identified within a "title" field of a web page. Additionally, or alternatively, a title may be located at a particular location on a web page (e.g., at the top of the web page). Address-title repository 110 may associate the title with the address of the web page with which the title corresponds.

Query-address-title generator 115 may analyze information in query log 105 in order to identify search queries that are associated with authoritative web pages. Query-address-title generator 115 may extract <query, address> pairs for these authoritative web pages. Query-address-title generator 115 may retrieve a title for a given address (from a <query, address> pair) from address-title repository 110. Query-address-title generator 115 may provide a <query, address, title> triplet, based on the retrieved <query, address> pair and the retrieved title, to query-address-title repository 120.

Query-address-title repository 120 may store information that associates queries, addresses, and titles. For example, a particular query may be associated with an address, which is associated with a title (as identified by information stored by address-title repository 110). Query-address-title repository 115 may store the <query, address, title> triplets provided by query-address-title generator 120.

Authoritative web page presentation component 125 may receive a search query (e.g., a search query entered by a user). Authoritative web page presentation component 125 may request an <address, title> pair, which corresponds to the query, from query-address-title repository 120. If query-address-title repository 120 locates stored information that includes a <query, address, title>triplet that matches the search query, query-address-title repository 120 may provide the address and title from the <query, address, title> triplet (e.g., as an <address, title> pair) to authoritative web page presentation component 125. Authoritative web page presentation component 125 may then provide the query, the address, and the title (e.g., as a <query, address, title> triplet), to a search engine (not pictured). Alternatively, authoritative web page presentation component 125 may provide the <address, title> pair to the search engine. The search engine may provide the address and title, in conjunction with a list of search results, in response to the search query.

Thus, a user is easily able to identify and view authoritative web pages that are associated with the user's search queries. Additionally, by not searching for the title of an authoritative web page until the authoritative web page, for a search query, is identified, system 100 is able to efficiently process query logs to identify authoritative web pages (e.g., which authoritative web pages are associated with search queries, the titles of the authoritative web pages, and the addresses of the authoritative web pages).

Example Environment

Figure 2:
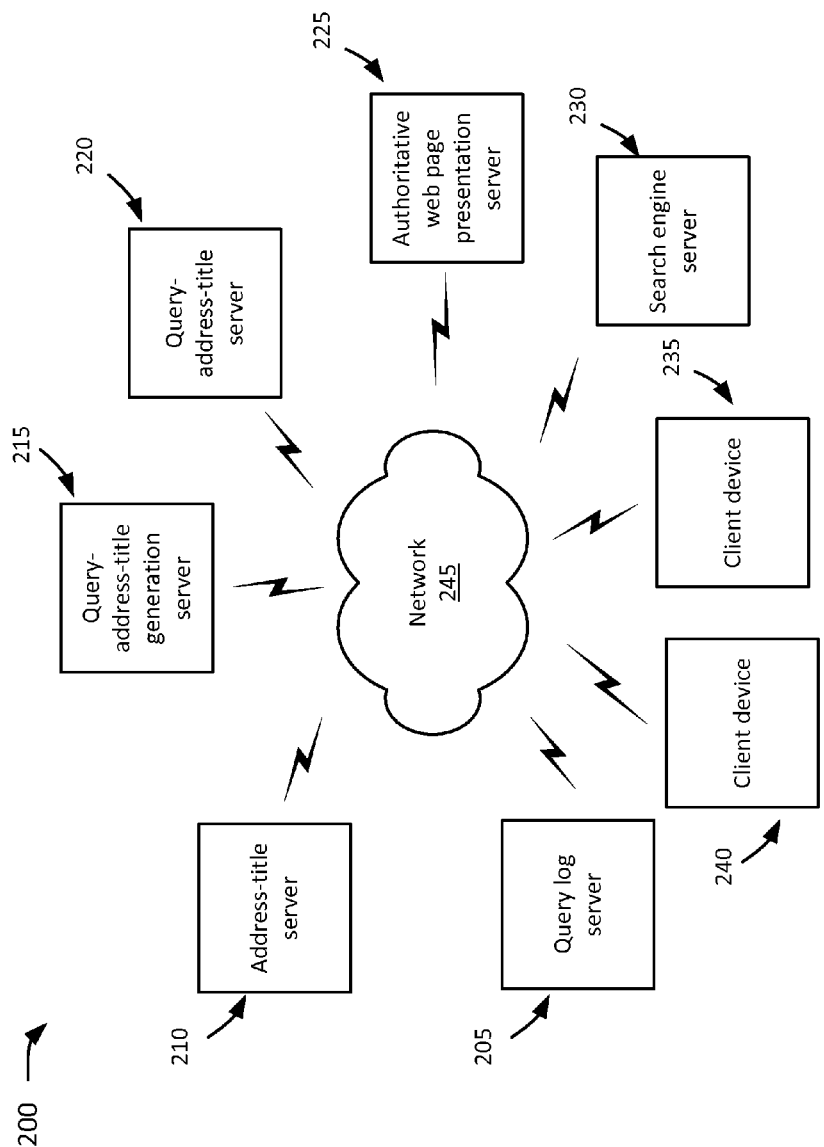
FIG. 2 is a diagram of an example environment in which systems and/or methods described herein may be implemented.

FIG. 2 is a diagram of an example environment 200 in which systems and/or methods described herein may be implemented. Environment 200 may include multiple servers 205-230 connected to each other, and to multiple clients 235-240 via a network 245. Seven servers 205-230 and two clients 235-240 have been illustrated as connected to network 245 for simplicity. In practice, there may be additional or fewer clients and servers. Also, in some instances, a client may perform a function of a server, and a server may perform a function of a client.

Each server 205-230 may be implemented as a single server device or a collection of server devices that may be co-located or remotely located. Additionally, or alternatively, any two or more of servers 205-230 may be implemented within a single, common server device or a single, common collection of server devices.

Servers 205-230 may include server devices that gather, process, search, and/or implement functions in a manner described herein. One or more of servers 205-230 may perform functions described with respect to one or more components described with respect to FIG. 1. For example, server 205 may implement functionality described with respect to query log 105, server 210 may implement functionality described with respect to address-title repository 110, server 215 may implement functionality described with respect to query-address-title generator 115, server 220 may implement functionality described with respect to query-address-title repository 120, and server 225 may implement functionality described with respect to authoritative web page presentation server 125.

Server 230 may implement a search engine that receives search queries (e.g., from client devices 235-240). Server 230 may interact with the one or more of servers 205-225 in order to determine whether a particular received search query is associated with an authoritative web page. Server 230 may provide a search result document to a client (e.g., client device 235/240) from which the search query was received. The search result document, provided by server 230, may include information regarding the authoritative web page. The search result document may further include information regarding one or more other web pages that were identified as responsive to the search query.

Each of clients 235-240 may include a client device, such as personal computer, a wireless telephone, a personal digital assistant ("PDA"), a laptop, or another type of computation or communication device. Clients 235-240 may include user interfaces presented through one or more browsers (e.g., web browsers, such as Chrome).

Additional servers, implementing other functions, although not explicitly shown, may also be implemented in environment 200. The additional servers may provide, for example, web content, payment services, shopping services, social networking services, etc.

While servers 205-230 are shown as separate components, it may be possible for one or more of servers 205-230 to perform one or more of the functions of another one or more of servers 205-230. For example, in one implementation, server 230 may perform the functions of server 225. Additionally, or alternatively, server 230 may perform the functions of one or more of servers 205-220.

Network 245 may include any type of network, such as a local area network ("LAN"), a wide area network ("WAN"), a telephone network (e.g., the Public Switched Telephone Network ("PSTN") or a cellular network), an intranet, the Internet, or a combination of networks. Servers 205-230 and clients 235-240 may connect to network 245 via wired and/or wireless connections. In other words, any one of servers 205-230 or clients 235-240 may connect to network 245 via a wired connection, a wireless connection, or a combination of a wired connection and a wireless connection.

Example Client/Server Components

Figure 3:
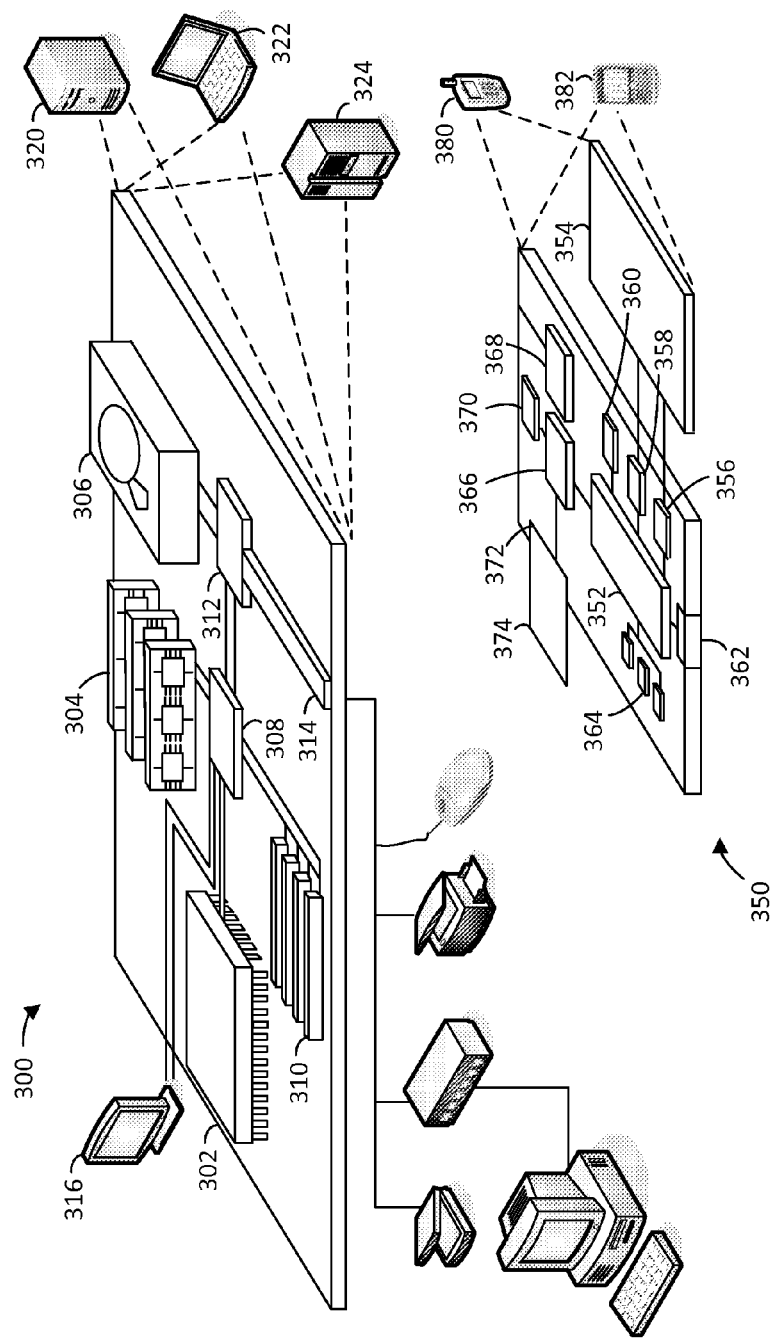
FIG. 3 shows an example of a generic computer device and a generic mobile computer device.

FIG. 3 shows an example of a generic computing device 300 and a generic mobile computing device 350, which may be used with the techniques described here. Generic computing device 300 and generic mobile computing device 350 may correspond to, for example, a client 205 and/or a server 210, 215, or 220. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations of the inventions described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface (GUI) on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system, etc.).

Memory 304 stores information within the computing device 300. In one implementation, memory 304 includes a volatile memory unit or units. In another implementation, memory 304 includes a non-volatile memory unit or units. The memory 304 may also be another form of computer-readable medium, such as a magnetic or optical disk.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In one implementation, high-speed controller 308 is coupled to memory 304, display 316 (e.g., through a graphics processor or accelerator), and to high-speed expansion ports 310, which may accept various expansion cards (not shown). In this implementation, low-speed controller 312 is coupled to storage device 306 and low-speed expansion port 314. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer-or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Figure 4:
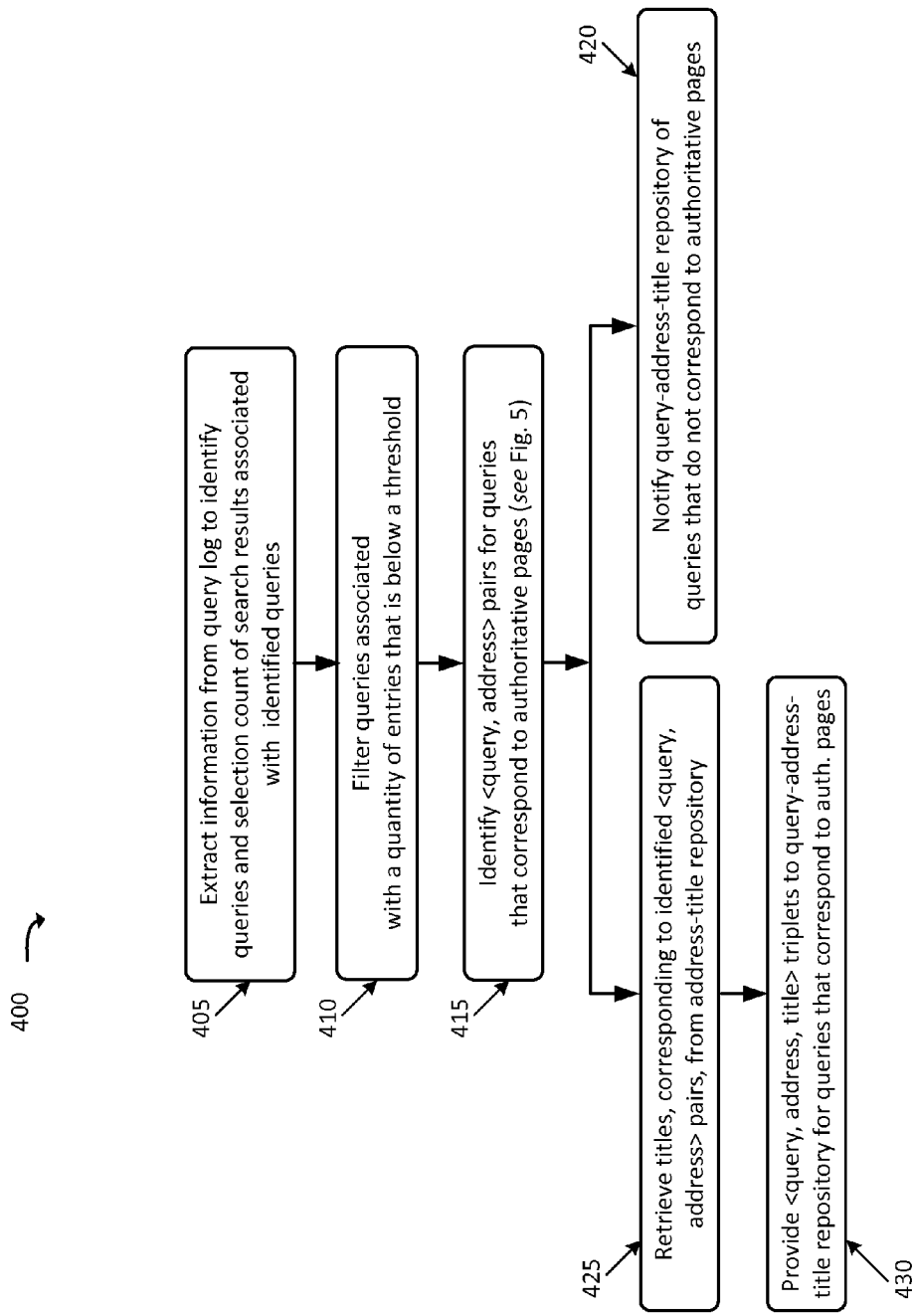
FIGS. 4 and 5 are flowcharts of example processes for identifying authoritative web pages that are associated with search queries.

Example Processes for Identifying Authoritative Web Pages Associated with Search Queries FIG. 4 is a flowchart illustrating an example process 400 for determining information regarding authoritative web pages. In one implementation, process 400 may be performed by query-address-title generation server 215. In another implementation, process 400 may be performed by one or more other components instead of, or possibly in conjunction with, query-address-title generation server 215. For example, some or all of process 400 may be performed by server 230.

As shown in FIG. 4, process 400 may include extracting information from a query log to identify search queries and a selection count of search results associated with identified search queries (block 405). For example, query-address-title generation server 215 may analyze a query log (e.g., query log 105) to identify one or more search queries stored in the query log. Query-address-title generation server 215 may also identify search results that were returned for each of the queries.

For instance, query-address-title generation server 215 may identify the search query "White house" in query log (e.g., a query log stored at query log server 205). Query-address-title generation server 215 may identify, based on information extracted from query log server 205, that three web pages—Web page A, Web page B, and Web page C—were returned as search results for the search query "White house." Query-address-title generation server 215 may also determine, based on information extracted from query log server 205, which of the web pages were returned as a top-listed search result. In other words, query-address-title generation server 215 may determine which of the web pages were returned as the highest ranking (e.g., most relevant, and/or most highly scored, based on any of a number of different ranking metrics) search result.

For each of the web pages identified as search results for the search query, query-address-title generation server 215 may identify a selection count. A selection count for a particular search result may indicate how many times the search result was selected (e.g., how many times the particular search result was "clicked," hovered over for a particular amount of time, and/or otherwise identified as desirable to a user) when presented as a search result for the search query. For example, for the search query "White house," Web page A may have been selected 200 times after being presented as a search result for the search query "White house," Web page B may have been selected 50 times, and Web page C may have been selected 30 times. In this example, Web page A has a selection count of 200, Web page B has a selection count of 50, and Web page C has a selection count of 30.

Query-address-title generation server 215 may also identify an overall selection count for the search results of the search query. In this example, the search query "White house" would have an overall selection count of 280, because the sum of the selection counts of Web page A, Web page B, and Web page C is 280.

When analyzing query log server 205 (at block 405), query-address-title generation server 215 may analyze only the search queries (and their associated search results) that were submitted within a particular time frame. For example, query-address-title generation server 215 may analyze only the search queries (and their associated search results) that were submitted within the last 180 days, 365 days, 90 days, etc.

When extracting information from query log server 205 (at block 405), query-address-title generation server 215 may use a programming language that facilitates the parsing of query logs. For example, query-address-title generation server 215 may execute a script that includes the "Sawzall" programming language.

As further shown in FIG. 4, process 400 may include filtering queries associated with a quantity of entries that is below a threshold (block 410). Some search queries may have been entered so few times, that the search queries may be deemed irrelevant/insignificant when identifying authoritative web pages. Query-address-title generation server 215 may identify, based on query counts of search queries, such insignificant search queries by identifying search queries, in query log server 205, that were entered less than a threshold quantity of times. The threshold quantity may be a configurable quantity, such as 1,000, 5,000, or any other integer. Query-address-title generation server 215 may exclude the irrelevant/insignificant search queries from further processing relating to authoritative web pages. As a result of the filtering, query-address-title generation server 215 may be left with a set of search queries to process further.

For example, query-address-title generation server 215 may identify, based on information extracted from query log server 205, that the search query "White house purple monkey dishwasher" has been submitted to a search engine 23 times over the past 180 days. Query-address-title generation server 215 may compare the quantity 23 to the threshold quantity (e.g., 1,000). Query-address-title generation server 215 may determine, based on this comparing, that the search query "White house purple monkey dishwasher" should be excluded from further processing, because 23 is less than 1,000.

Further to the above example, query-address-title generation server 215 may identify, based on information extracted from query log server 205, that the search query "White house" has been submitted to a search engine 9,876 times over the past 180 days. Query-address-title generation server 215 may compare the quantity 9,876 to the threshold quantity (e.g., 1,000). Query-address-title generation server 215 may determine, based on this comparing, that the search query "White house" should be not be excluded from further processing because 9,876 is greater than 1,000.

After filtering the search queries (at block 410), query-address-title generation server 215 may again extract information from query log server 205, excluding the filtered search queries (not pictured). Additionally, or alternatively, after filtering the search queries (at block 410), query-address-title generation server 215 may simply flag the filtered search queries as "filtered."

Process 400 may further include identifying <query, address> pairs for search queries that correspond to authoritative web pages (block 415). As further explained below with respect to FIG. 5, query-address-title generation server 215 may, for instance, analyze information, extracted from query log server 205 and associated with the set of search queries, to identify addresses of authoritative web pages that are associated with search queries. For example, query-address-title generation server 215 may identify that the search query "White house" is associated with an authoritative web page, which may be located at the address, "www.whitehouse.gov."

While some search queries may be associated with an authoritative web page, query-address-title generation server 215 may also identify (at block 415) that other search queries may not be associated with an authoritative web page. For example, query-address-title generation server 215 may determine that the search query "How many calories should I eat a day," while popular (e.g., the search query may have been submitted a quantity of times that is greater than the above-mentioned threshold quantity), may not be associated with an authoritative web page.

Process 400 may further include notifying a query-address-title repository of search queries that are not associated with authoritative web pages (block 420). For example, query-address-title generation server 215 may notify query-address-title server 220 that the search query "How many calories should I eat a day" is not associated with an authoritative web page. Query-address-title server 220 may determine whether an association exists in query-address-title server 220 between the search query and an address and/or title. If such an association exists, the notification from query-address-title generation server 215 may indicate that the association should no longer exist (e.g., query-address-title generation server 215 has determined that the search query is no longer associated with an authoritative web page). Query-address-title repository may delete the association upon such a notification.

Process 400 may additionally include retrieving titles, corresponding to identified <query, address> pairs, from an address-title repository (block 425). For example, query-address-title generation server 215 may retrieve a title, associated with the <query, address> pair <"White house", "www.whitehouse.gov">from address-title server 210. In order to do so, query-address-title generation server 215 may cause a search to be executed on information stored in address-title repository 110. For instance, query-address-title generation server 215 may provide the address "www.whitehouse.gov" to address-title server 210. Address-title server 210 may perform a search on the information stored in address-title repository, using the address as a primary key in the search. Upon identifying an association between the address and a corresponding title (e.g., "The White House"). Address-title server 210 may provide the corresponding title to query-address-title generation server 215.

Upon receiving the title, query-address-title generation server 215 may form a <query, address, title> triplet. For instance, further to the above example, query-address-title generation server 215 may form a <query, address, title> triplet of <"White house", "www.whitehouse.gov", "The White House">.

Process 400 may further include providing <query, address, title> triplets to a query-address-title repository (block 430). For example, query-address-title generation server 215 may provide <query, address, title> triplets, that correspond to search queries for which authoritative web pages were identified (e.g., <"White house", "www.whitehouse.gov", "The White House">) to query-address-title repository 120.

While process 400 was described as including the above-mentioned blocks 405-430, some or all of these blocks may be considered optional. For example, in one implementation, block 410 may be omitted (e.g., queries may not be filtered). Furthermore, certain blocks may be performed in parallel with other blocks. For instance, block 420 may be performed while block(s) 425 and/or 430 are performed. Additionally, while some of the above examples discussed a single search query for the sake of simplicity, process 400 may be performed on multiple (e.g., hundreds, thousands, millions, etc.) search queries within a query log. Alternatively, or additionally, process 400 may be performed concurrently on multiple search queries within a query log.

In one implementation, titles may be retrieved only for those web pages that are identified as authoritative web pages. By only retrieving titles for these identified web pages, time and processing power may be saved, as opposed to an implementation that determines titles for pages that are not identified as authoritative.

Figure 5:
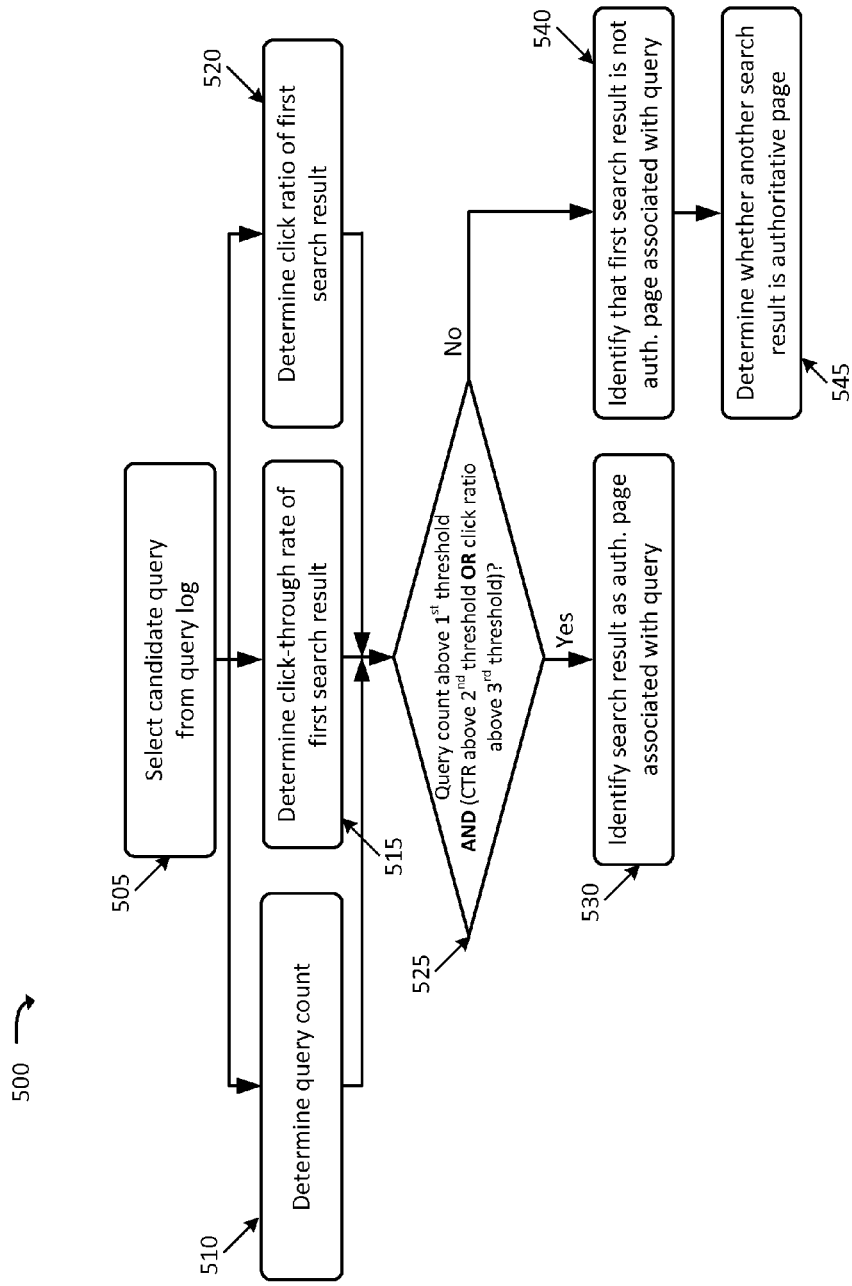

FIG. 5 is a flowchart illustrating an example process 500 for identifying authoritative web pages that are associated with search queries. As mentioned above, block 415, of process 400, may include a portion of, or the entirety of, process 500. In one implementation, process 500 may be performed by query-address-title generation server 215. In another implementation, process 500 may be performed by one or more other components instead of, or possibly in conjunction with, query-address-title generation server 215. For example, some or all of process 500 may be performed by server 230.

As shown in FIG. 5, process 500 may include selecting a candidate query from a query log (block 505). For example, query-address-title generation server 215 may select a candidate search query of "White house" from query log server 205. Process 500 may further include determining a query count for the candidate search query (e.g., a quantity of times that the candidate search query was submitted) over a particular period of time, such as within the last 180 days (block 510). For example, query-address-title generation server 215 may determine, based on information extracted from query log server 205, that the search query "White house" was submitted as a search query 9,876 times over the past 180 days.

As further shown in FIG. 5, process 500 may include determining a click-through-rate ("CTR") of a first search result associated with the candidate search query (e.g., a highest ranked (top-listed) search result, out of a list of search results that is generated in response to the candidate search query) over a particular period of time (e.g., 180 days) (block 515). This particular period of time may be the same period of time discussed above with respect to block 510.

The CTR of the first search result may be determined based on the quantity of times that the candidate search query was submitted, and the quantity of times that the first search result was selected (e.g., "clicked," "hovered over," etc.) when presented as the first search result for the candidate search query. Specifically, for instance, the CTR of the first search result may be determined by dividing the quantity of times that the first search result was selected by the quantity of times that the candidate search query was submitted.

For example, query-address-title generation server 215 may identify that a first search result (e.g., a search result corresponding to the web page located at the address of "www.whitehouse.gov") was selected 4,321 times when presented as a first search result for the search query "White house" within the last 180 days. Query-address-title generation server 215 may divide the quantity of times that the identified first search result was selected (e.g., 4,321 in this example) by the quantity of times that "White house" was submitted as a search query (e.g., 9,876 in this example). Thus, in this example, the CTR for "www.whitehouse.gov," when presented as a first search result for "White house" over the last 180 days, would be (4,321/9,876≈0.4375).

Process 500 may further include determining a click ratio of the first search result associated with the candidate search query (block 520). The click ratio may be determined based on the quantity of times that the first search result was selected (e.g., "clicked," "hovered over," etc.) when presented as the first search result for the candidate search query and a total quantity of times that any search result was selected when presented as a search result for the candidate query. Specifically, for instance, the click ratio the first search result may be determined by dividing the quantity of times that the first search result was selected by the total quantity of times that any search result was selected when presented as a search result for the candidate query. The click ratio may be determined based on selections made over a particular period of time (e.g., within the last 180 days). This particular period of time may be the same period of time discussed above with respect to blocks 510 and/or 515.

For example, query-address-title generation server 215 may identify that a first search result (e.g., a search result corresponding to the web page located at the address of "www.whitehouse.gov") was selected 4,321 times when presented as a first search result for the search query "White house" within the last 180 days. Query-address-title generation server 215 may further identify that 6,543 total selections were made of any search result that was presented as search results for the search query "White house." Specifically, in this example, 4,321 selections were made on the first search result ("www.whitehouse.gov"), while 2,222 (i.e., 6,543-4, 321) selections were made on other search results. Thus, in this example, the click ratio for "www.whitehouse.gov," when presented as a first search result for "White house" over the last 180 days, would be (4,321/6,543≈0.6604).

Process 500 may further include determining, based on one or more conditions, whether the first search result, discussed above with respect to one or more of block(s) 510-520, corresponds to an authoritative web page associated with the candidate search query (block 525). The conditions may include whether the query count (determined at, e.g., block 510) is above a first threshold, whether the first search result CTR (determined at, e.g., block 515) is above a second threshold, and/or whether the first search result click ratio (determined at, e.g., block 520) is above a third threshold. One or more of these thresholds may be the same. Additionally, or alternatively, some or all of these thresholds may be different. Any of these thresholds may be human-configurable.

In the example illustrated in FIG. 5, the conditions may include one or more compound conditions (e.g., a condition that is based on one or more other conditions). The conditions may include one or more Boolean conditions (such as AND, OR, NOT, etc.). As shown in FIG. 5, the first search result may be determined to correspond to an authoritative web page associated with the candidate search query if:

(the candidate query count is above the first threshold)
AND ((the first search CTR is above the second threshold) OR (the first search click ratio is above the third threshold)).

While the above conditional statement is presented as an example, other conditions may be used in order to determine whether the first search result corresponds to an authoritative web page associated with the candidate search query. For example, the AND condition above may be replaced with an OR condition and/or the OR condition above may be replaced with an AND condition.

Continuing with the example above, query-address-title generation server 215 may identify that the query count for the search query "White house" (e.g., 9,876 in this example) is above a first threshold (e.g., 1,000). Query-address-title generation server 215 may further identify that the first search result CTR for the search result corresponding to the address "www.whitehouse.gov" (e.g., 0.4375 in this example) is above a second threshold (e.g., 0.4000). Query-address-title generation server 215 may further identify that the first search result click ratio for the search result "www.whitehouse.gov" (e.g., 0.6604) is above a third threshold (e.g., 0.5000). When the conditions shown in block 525 are satisfied (block 525—YES), the first search result corresponding to the address "www.whitehouse.gov" may be identified as an authoritative web page associated with the candidate search query (block 530).

If, on the other hand, a first search result is identified for a candidate search query that does not meet the conditions (block 525—NO), the first search result may be identified as not an authoritative web page associated with the candidate search query (block 540). In such an example, query-address-title generation server 215 may further identify the candidate search query as a search query that is not associated with an authoritative web page.

As further shown in FIG. 5, if the first search result is not an authoritative web page associated with the candidate query, process 500 may include determining whether another search result is an authoritative web page (block 545). For instance, query-address-title generation server 215 may repeat one or more of blocks 510-540 for the candidate search query, using one or more lower-ranked search results instead of the first search result. For example, query-address-title generation server 215 may determine a CTR of a second search result (e.g., a next-to-highest ranked (next-to-top-listed) search result, out of a list of search results that is generated in response to the candidate search query), in a list of search results that is presented in response to the candidate search query (similar to block 515), determine a click ratio of the second search result (similar to block 520), etc. If the conditions are met for the second search result (block 525—YES), query-address-title generation server 215 may identify the second search result as the authoritative web page associated with the candidate query (block 530). Otherwise, query-address-title generation server 215 may continue blocks 510-540 for other search results.

Query-address-title generation server 215 may only attempt to determine an authoritative web page for a candidate search query a predetermined quantity of times. In other words, if an authoritative web page is not determined by a particular iteration (e.g., by the first iteration, the second iteration, the third iteration, etc.) of blocks 510-540, query-address-title generation server 215 may determine that the candidate search query is not associated with an authoritative web page (block 540).

While process 500 was described as including the above-mentioned blocks 505-545, some or all of these blocks may be considered optional. For example, in one implementation, one or more of blocks 510-520 may be omitted. Furthermore, as discussed above, different conditions may be used at block 525. For instance, if block 515 is omitted (i.e., if a first search result CTR is not determined), block 525 may include a condition that does not include the first search CTR. Furthermore, certain blocks may be performed in parallel with other blocks. For instance, one or more of blocks 510-520 may be performed while any other one(s) of blocks 510-520 is/are performed.

Additionally, or alternatively, block 545 may be omitted in one implementation. In such an implementation, query-address-title generation server 215 would only examine first search results when determining an authoritative web page associated with a candidate search query.

Example Process For Providing Information Regarding Authoritative Web Pages

Figure 6:
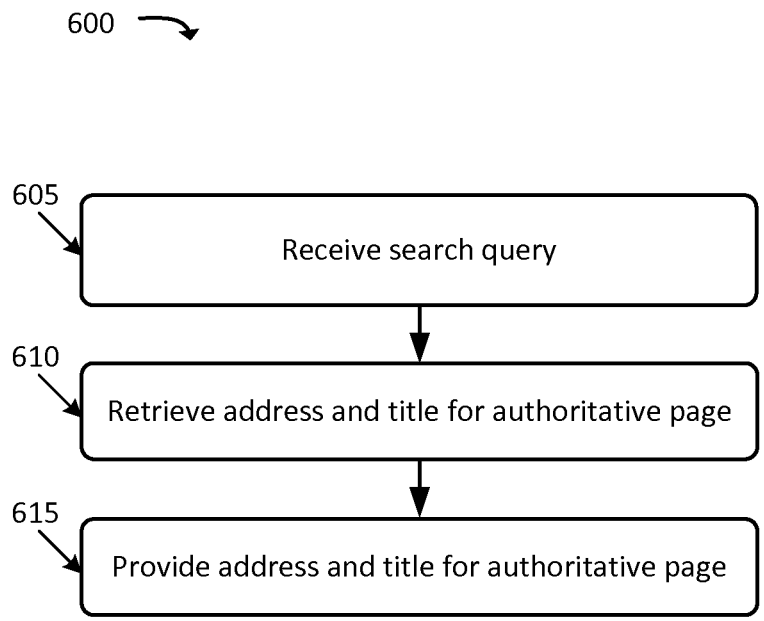
FIG. 6 is a flowchart of an example process for retrieving a Uniform Resource Locator ("URL") and title for an authoritative web page in response to a search query.

FIG. 6 is an example process 600 for providing information regarding authoritative web pages for use by a search engine. In one implementation, process 600 may be performed by authoritative web page presentation server 225. In another implementation, process 600 may be performed by one or more other components instead of, or possibly in conjunction with, authoritative web page presentation server 225. For example, some or all of process 600 may be performed by server 230.

As shown in FIG. 6, process 600 may include receiving a search query (block 605). For example, authoritative web page presentation server 225 may receive a search query from a search engine (e.g., a search engine implemented at search engine server 230). Alternatively, authoritative web page presentation server 225 may receive a search query from a client device (e.g., client device 235 or 240).

Process 600 may further include retrieving an address and title for an authoritative web page that is associated with the search query (block 610). For example, authoritative web page presentation server 225 may cause a search to be executed on information stored by query-address-title repository 120. The search may include using the search query as a key in order to locate an entry, stored by query-address-title repository 120, that associates a search query with an address and a title (e.g., an entry that includes a <query, address, title> triplet).

The key (i.e., the search query) may be, for example, "White house," and the located information, stored by query-address-title repository 120, may associate the search query "White house" with the address "www.whitehouse.gov" and the title "The White House." Query-address-title repository 120 may store the <query, address, title> triplet, <"White house", "www.whitehouse.gov", "The White House">. Upon locating this information, query-address-title repository 120 may provide some or all of the information (e.g., the address and the title) to authoritative web page presentation server 225.

Process 600 may also include providing the retrieved address and title associated with the authoritative web page (block 615). For example, authoritative web page presentation server 225 may provide the address "www.whitehouse.gov" and the title "The White House" to the search engine. In one implementation, the address and title may be formatted as an <address, title> pair.

The above process is described in the context of a search query that is assumed to be associated with an authoritative web page. However, in some examples, as described above with respect to FIGS. 4 and 5, some search queries may not be associated with an authoritative web page. In some such examples, it may be determined (e.g. by authoritative web page presentation server 225 and/or by query-address-title repository 120) that query-address-title repository 120 does not include an association between a particular search query and an authoritative web page (e.g., query-address-title repository 120 may not store a <query, address, title> triplet that corresponds to the particular search query). In some such instances, authoritative web page presentation server 225 may inform the search engine that the search query is not associated with an authoritative web page.

While process 600 was described as including the above-mentioned blocks 605-615, some or all of these blocks may be considered optional. Furthermore, certain blocks may be performed in parallel with other blocks. For instance, block 420 may be performed while block(s) 425 and/or 430 are performed.

Figure 7:
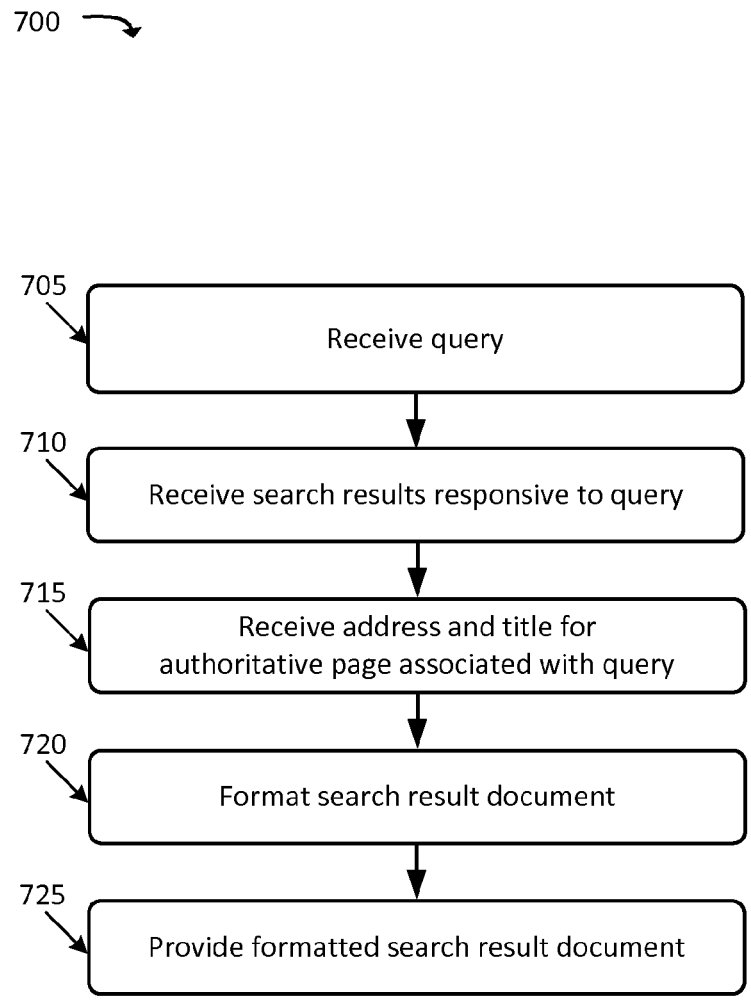
FIG. 7 is a flowchart of an example process for providing search results and an authoritative web page in response to a search query.

Example Process for Presenting Information Regarding an Authoritative Web Page in Response to a Search Query FIG. 7 is a flowchart of an example process 700 for presenting information regarding an authoritative web page in response to a search query. In one implementation, process 700 may be performed by a search engine (e.g., a search engine implemented at search engine server 230). In another implementation, process 700 may be performed by one or more other components instead of, or possibly in conjunction with, the search engine.

As shown in FIG. 7, process 700 may include receiving a search query (block 705). For example, the search engine may receive the search query from a client (e.g., a client implemented at one or more of client devices 235 or 240), via, e.g., a web browser at the client. As in the examples discussed above, assume that the search query is "White house." Process 700 may also include receiving search results that are responsive to the search query (block 710). For example, the search engine may receive a list of web pages that are responsive to (e.g., that are relevance to, and/or are otherwise responsive to) the search query "White house." In one implementation, the search engine may perform a search of an index to identify relevant web pages.

Process 700 may further include receiving an address and a title for an authoritative web page associated with the search query (block 715). The address and the title may be received as an <address, title> pair. For example, in one implementation, the search engine may receive the <address, title> pair <"www.whitehouse.gov", "The White House">from authoritative web page presentation server 225.

Process 700 may additionally include generating and formatting a search result document (block 720). For example, the search engine may generate a search result document, similar to the document shown in user interface 800 of FIG. 8. User interface 800 may include, among other items, information regarding an authoritative web page result (also referred to as "authoritative web page result 805"), authoritative web page result indicators 806 and 807, and information regarding other search results that are responsive to the search query (also referred to as "search results 810"). The set of search results 810 may include multiple results, including a first search result 815.

Figure 8:
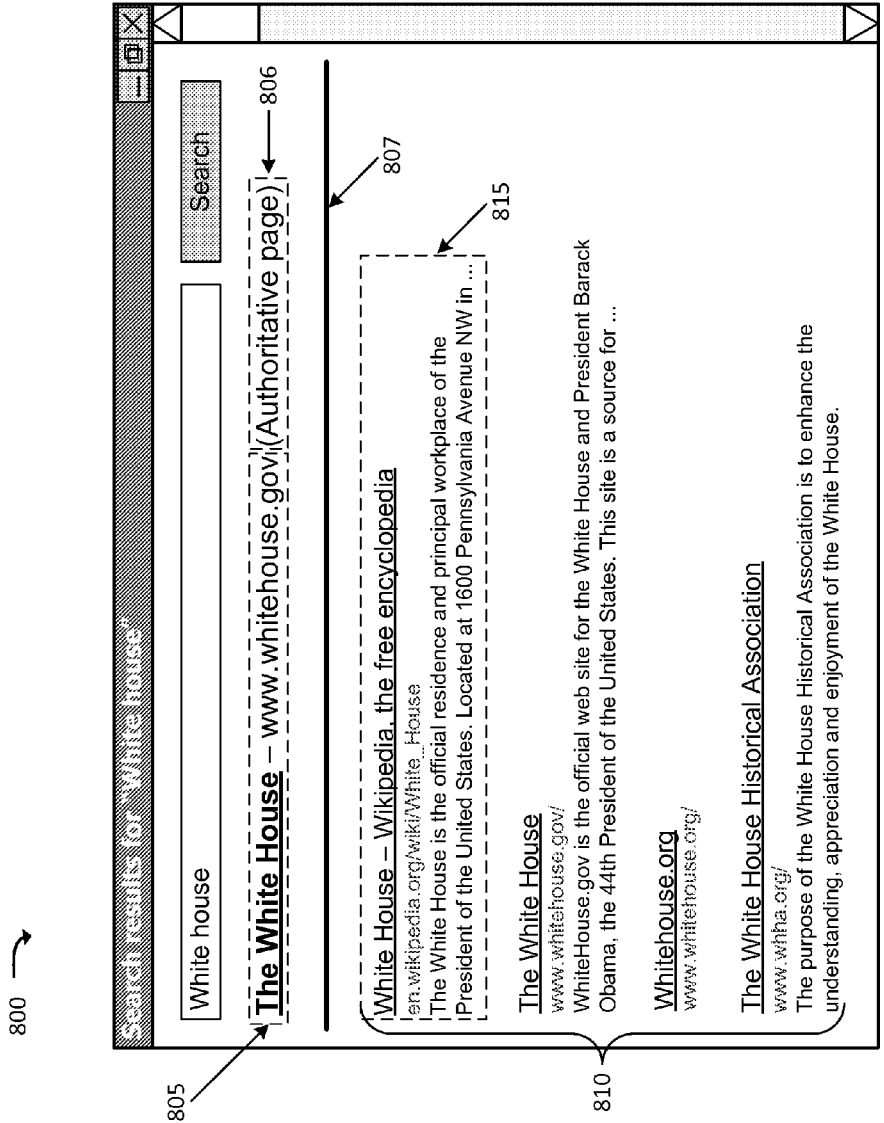
FIG. 8 is a diagram of an example user interface that displays search results and an authoritative web page in response to a search query.

As shown in FIG. 8, the search result document shown in user interface 800 may include an authoritative web page result 805. The authoritative web page result 805 may be visually presented more prominently than one or more (or all) of search results 810. For example, authoritative web page result 805 may be presented in a different color than search results 810, may be presented in a larger font than search results 810, may be presented in a visual location on the page that is above search results 810, etc.

Additionally, other indicators may be provided to inform a user that authoritative web page result 805 is an authoritative web page result. For example, additional text 806 may be inserted that denotes authoritative web page result 805. As shown in FIG. 8, additional text 806 may include "(Authoritative page)"—however, in other examples, additional, or different text may be used as additional text 806. Furthermore, visual separator 807, such as the horizontal line shown in FIG. 8, may separate authoritative web page result 805 from other items (e.g., search results 810) that may be shown on the search result document.

Search results 810 may include search results, that are responsive to the search query, received by the search engine (e.g., at block 710). Search results 810 may be ordered based on any number of factors, including relevance to the search query. Search results 815 may include first search result 815, corresponding to a web page located at "en.wikipedia.org/wiki/White_House". In the example shown in FIG. 8, first search result 815 corresponds to a page that is different from authoritative web page result 805. In other examples, a first search result may correspond to a page that is the same as an authoritative web page result for a search query.

While example user interface 800 is illustrated as including certain features, user interface 800 may include fewer, additional, or different features in other implementations. For example, user interface 800 may include links, such as links to cached versions of search results, links to image results, links to news results, links to product results, etc.

Returning to FIG. 7, process 700 may further include providing the formatted search result document (e.g., a document that is formatted in a manner as described above with respect to user interface 800) (block 725). For example, the search engine may provide the formatted search result document to the client device from which the search query was received. The client device may, in turn, display the formatted search result document (e.g., via a web browser of the client device).

In such a manner, a user who submits a search query may be able to easily identify an authoritative web page, which is associated with the search query. Continuing with the example of the search query, "White house," a user may be able to quickly identify a web page, marked as "authoritative."

CONCLUSION

An implementation, described herein, may identify authoritative web pages associated with search queries, and provide for the prominent display of these authoritative web pages when providing a user with search results that are responsive to the search queries.

Although an implementation is described above in the context of web pages, any other the above system(s) and/or process(es) may be applied to any type of document. For example, such documents may include images, videos, audio recordings, descriptions of products, news, etc. Furthermore, a document may refer to a single web page, a collection of web pages, a web site, etc.

Furthermore, although an implementation is described above in the context of one search query, it should be understood that multiple search queries may be associated with one authoritative web page. For example, the search queries "White house," "whitehouse," "whitehous," "whitehouse.gov," etc. may be associated with the web page located at the address "www.whitehouse.gov."

The foregoing description provides illustration and description, but is not intended to be exhaustive or to limit the implementations to the precise form disclosed. Modifications and variations are possible in light of the above teachings or may be acquired from practice of the implementations.

As used herein, the term "component," is intended to be broadly interpreted to refer to hardware, software, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    extracting, by at least one of one or more server devices and from a query log, query log information associated with a search query,
        the extracted query log information including:
            information regarding the search query, and
            information regarding search results that were provided based on the search query;
    determining, by at least one of the one or more server devices and based on the query log information, a plurality of metrics derived from one or more selections of a particular search result when the particular search result was provided based on the search query,
        the plurality of metrics including:
            a query count that is associated with the search query and is above a first threshold, and
            at least one of:
                a click-through rate that is associated with the particular search result and is above a second threshold, or
                a click ratio that is associated with the particular search result and is above a third threshold;
    determining, by at least one of the one or more server devices and based on the plurality of metrics derived from one or more selections of the particular search result when the particular search result was provided based on the search query, that the particular search result corresponds to an authoritative web page associated with the search query; and
    identifying, by at least one of the one or more server devices and upon determining that the particular search result corresponds to the authoritative web page associated with the search query, a title associated with the particular search result.

2. The method of claim 1, where the information regarding the search results includes information regarding the particular search result.

3. The method of claim 2, where a search result document includes two links to a web location identifier of the particular search result.

4. The method of claim 1, further comprising:
    determining, based on the query log information, a quantity of times that the search query was submitted within a particular time period, the query count corresponding to the quantity of times that the search query was submitted within the particular time period, where, when determining that the particular search result corresponds to the authoritative web page associated with the search query, the method further includes: determining that the quantity of times that the search query was submitted within the particular time period is greater than the first threshold.

5. The method of claim 1, further comprising:
    determining the click-through rate, where, when determining the click-through rate, the method includes:
        determining, based on the query log information, a first quantity of times that the search query was submitted within a particular time period;
        determining, based on the query log information, a second quantity of times that the particular search result was selected when the particular search result was provided based on the search query submitted within the particular time period; and
        dividing the second quantity by the first quantity to determine the click-through rate for the particular search result.

6. The method of claim 1, further comprising:
determining the click ratio, where, when determining the click ratio, the method includes:
- determining, based on the query log information, a first quantity of times that the particular search result was selected when the particular search result was provided based on the search query within a particular time period;
- determining, based on the query log information, a second quantity of times that any search result was selected when provided based on the search query within the particular time period; and
- dividing the first quantity by the second quantity to determine the click ratio for the particular search result.

7. The method of claim 1, further comprising:
providing, to a client device, a search result document based on another search query received from the client device, where:
- the other search query matches the search query,
- the search result document includes information regarding the particular search result and information regarding a plurality of other search results,
- the information regarding the particular search result is presented in a more prominent location, within the search result document, than the information regarding the plurality of other search results, and
- the information regarding the particular search result includes:
  - the title associated with the particular search result, and
  - a link to the particular search result.

8. A system comprising:
a memory device storing instructions; and
one or more processors to execute the instructions to:
- extract, from a query log, query log information associated with a search query,
  - the extracted query log information including:
    - information regarding the search query, and
    - information regarding search results that were provided based on the search query;
- determine, based on the query log information, a plurality of metrics derived from one or more selections of a particular search result when the particular search result was provided based on the search query,
  - the plurality of metrics including:
    - a query count that is associated with the search query and is above a first threshold, and
    - at least one of:
      - a click-through rate that is associated with the particular search result and is above a second threshold, or
      - a click ratio that is associated with the particular search result and is above a third threshold;
- determine, based on the plurality of metrics derived from one or more selections of the particular search result when the particular search result was provided based on the search query, that the particular search result corresponds to an authoritative web page associated with the search query; and
- identify, upon determining that the particular search result corresponds to the authoritative web page associated with the search query, a title associated with the particular search result.

9. The system of claim 8, where the information regarding the search results includes information regarding the particular search result.

10. The system of claim 8, where the one or more processors are further to: determine, based on the query log information, a quantity of times that the search query was submitted within a particular time period, the query count corresponding to the quantity of times that the search query was submitted within the particular time period, where, when determining that the particular search result corresponds to the authoritative web page associated with the search query, the one or more processors are further to: determine that the quantity of times that the search query was submitted within the particular time period satisfies is greater than the first threshold.

11. The system of claim 8, where the one or more processors are further to:
determine the click-through rate, where, when determining the click-through rate, the one or more processors are further to:
- determine, based on the query log information, a first quantity of times that the search query was submitted within a particular time period;
- determine, based on the query log information, a second quantity of times that the particular search result was selected when the particular search result was provided based on the search query submitted within the particular time period; and
- divide the second quantity by the first quantity to determine the click-through rate for the particular search result.

12. The system of claim 8, where the one or more processors are further to:
determine the click ratio, where, when determining the click ratio, the one or more processors are further to:
- determine, based on the query log information, a first quantity of times that the particular search result was selected when the particular search result was provided based on the search query within a particular time period;
- determine, based on the query log information, a second quantity of times that any search result was selected when provided based on the search query within the particular time period; and
- divide the first quantity by the second quantity to determine the click ratio for the particular search result.

13. The system of claim 8, where the one or more processors are further to:
provide, to a client device, a search result document based on another search query received from the client device, where:
- the other search query matches the search query,
- the search result document includes information regarding the particular search result and information regarding a plurality of other search results,
- the information regarding the particular search result is presented in a more prominent location, within the search result document, than the information regarding the plurality of other search results, and
- the information regarding the particular search result includes:
  - the title associated with the particular search result, and
  - a link to the particular search result.

14. A non-transitory computer-readable memory device storing computer-executable instructions, the computer-executable instructions comprising:
one or more instructions which, when executed by a processor, cause the processor to:

extract, from a query log, query log information associated with a search query,
the extracted query log information including:
information regarding the search query, and
information regarding search results that were provided based on the search query;
determine, based on the query log information, a plurality of metrics derived from one or more selections of the particular search result when the particular search result was provided based on the search query,
the plurality of metrics including:
a query count that is associated with the search query and is above a first threshold, and
at least one of:
a click-through rate that is associated with the particular search result and is above a second threshold, or
a click ratio that is associated with the particular search result and is above a third threshold;
determine, based on the plurality of metrics derived from one or more selections of the particular search result when the particular search result was provided based on the search query, that the particular search result corresponds to an authoritative web page associated with the search query; and
identify, upon determining that the particular search result corresponds to the authoritative web page associated with the search query, a title associated with the particular search result.

15. The non-transitory computer-readable memory device of claim 14, where the computer-executable instructions further comprise:
one or more instructions to determine, based on the query log information, a quantity of times that the search query was submitted within a particular time period, the query count corresponding to the quantity of times that the search query was submitted within the particular time period, where the one or more instructions to determine that the particular search result corresponds to the authoritative web page associated with the search query include: one or more instructions to determine that the quantity of times that the search query was submitted within the particular time period satisfies is greater than the first threshold.

16. The non-transitory computer-readable memory device of claim 14, where the computer-executable instructions further comprise:
one or more instructions to determine the click-through rate, the one or more instructions to determine the click-through rate including:
one or more instructions to determine, based on the query log information, a first quantity of times that the search query was submitted within a particular time period;
one or more instructions to determine, based on the query log information, a second quantity of times that the particular search result was selected when the particular search result was provided based on the search query submitted within the particular time period; and
one or more instructions to divide the second quantity by the first quantity to determine the click-through rate for the particular search result.

17. The non-transitory computer-readable memory device of claim 14, where the computer-executable instructions further comprise:
one or more instructions to determine the click ratio, the one or more instructions to determine the click ratio including:
one or more instructions to determine, based on the query log information, a first quantity of times that the particular search result was selected when the particular search result was provided based on the search query within a particular time period;
one or more instructions to determine, based on the query log information, a second quantity of times that any search result was selected when provided based on the search query within the particular time period; and
one or more instructions to divide the first quantity by the second quantity to determine the click ratio for the particular search result.

18. The non-transitory computer-readable memory device of claim 14, where the computer-executable instructions further comprise:
one or more instructions to provide, to a client device, a search result document based on another search query received from the client device, where:
the other search query matches the search query,
the search result document includes information regarding the particular search result and information regarding a plurality of other search results,
the information regarding the particular search result is presented in a more prominent location, within the search result document, than the information regarding the plurality of other search results, and
the information regarding the particular search result includes:
the title associated with the particular search result, and
a link to the particular search result.

19. The system of claim 9, where a search result document includes two links to a web location identifier of the particular search result.

20. The non-transitory computer-readable memory device of claim 14, where the information regarding the search results includes information regarding the particular search result.

21. The non-transitory computer-readable memory device of claim 15, where a search result document includes two links to a web location identifier of the particular search result.

* * * * *